B. B. & J. W. SPRATLIN.
SIGNALING ATTACHMENT FOR GRAIN MILLS.
APPLICATION FILED OCT. 5, 1908.
922,821.
Patented May 25, 1909.
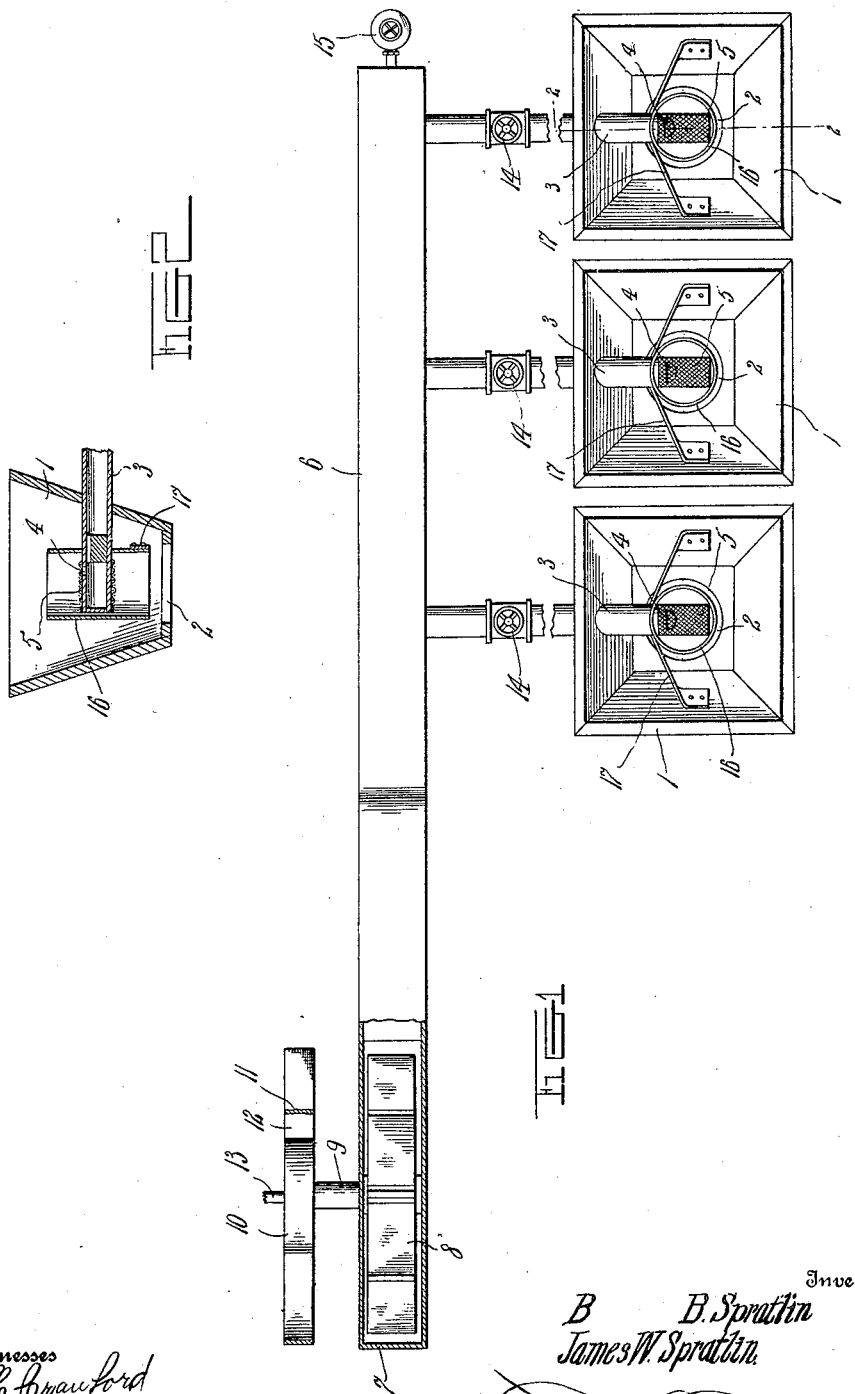
Witnesses
J. H. Crawford
B. E. Cookley
Inventors
B. B. Spratlin
James W. Spratlin
By 
Attorneys

UNITED STATES PATENT OFFICE.

BEN B. SPRATLIN AND JAMES W. SPRATLIN, OF HULL, GEORGIA.

SIGNALING ATTACHMENT FOR GRAIN-MILLS.

No. 922,821.  Specification of Letters Patent.  Patented May 25, 1909.

Application filed October 5, 1908. Serial No. 456,203.

*To all whom it may concern:*

Be it known that we, BEN B. SPRATLIN and JAMES W. SPRATLIN, citizens of the United States, residing at Hull, in the county of Madison, State of Georgia, have invented certain new and useful Improvements in Signaling Attachments for Grain-Mills; and we do hereby declare the following to be a full, clear, and exact description of the invention, such as will enable others skilled in the art to which it appertains to make and use the same.

The present invention relates to attachments for grain mills, and it has for its principal object the production of an extremely simple and effective apparatus for automatically notifying the mill hands by means of an audible signal when the grain level in the hoppers has fallen to a predetermined point.

To this end, the invention, briefly described, comprises an air-supply pipe, and a series of whistles which communicate therewith at one end, and have their other ends extending into the hoppers, so as to be covered by the grain when the level thereof is normal, and to be uncovered when the grain has been exhausted to a predetermined extent, in which latter instance the whistles will be automatically sounded.

More especially, however, the invention resides in the provision of devices for cutting out any one of the whistles, when the occasion for such action arises; of devices for preventing the whistles from becoming choked; and of devices for regulating the flow of air through the supply pipe.

The preferred embodiment of the invention is illustrated in the accompanying drawings, in which, Figure 1 is a plan view of the complete apparatus, parts thereof being broken away. Fig. 2 is an enlarged vertical section through one of the hoppers on the line 2—2.

Corresponding parts are designated by the same reference numerals throughout both views.

Referring more particularly to the drawings, there is shown a series of hoppers 1 (in the present instance three) each of which has its bottom wall provided with a discharge opening 2. Into each hopper extends the outer or operating end of a whistle 3 whose air outlet port 4 is arranged to be covered by a fine wire screen 5. These whistles which are horizontally disposed, communicate at their inner ends with a horizontal air supply pipe 6 which communicates in turn at one end with the casing 7 of a fan 8, the fan being mounted upon a shaft 9 which carries a pulley 10 connected by a belt 11 with a larger pulley 12 mounted upon a drive shaft 13, rotation of the last-mentioned shaft being effected in any preferred manner. Adjacent the point at which it enters the supply pipe, the stem or body of each whistle is provided with a cut-off valve 14, while the pipe itself has its closed outer end provided with a globe valve 15. As a result of this construction, it will be obvious that the current of air which flows through the supply pipe can be regulated at will by the globe valve, and also that communication between any one of the whistles and said pipe may be opened or closed at will by means of the cut-off valves. The whistles, which are preferably disposed directly above the discharge openings 2, have the outer or operating ends thereof arranged to extend into open ended cylindrical members or casings 16 which are secured to the sides of the hoppers by means of straps 17. The members 16 are designed to be filled by the grain or other material with which the hoppers themselves are filled, the meshes of the various screens 5 being sufficiently fine to prevent the whistles from becoming choked by the entrance of such material through the openings 4. The members 16 are disposed directly central of the hoppers and in line with the openings 2 in the bottoms thereof, so as to insure the material collecting around and uncovering the whistle ends, as well as to insure a discharge of the material within said members.

In the operation of the invention the hoppers and with them the members 16, are filled almost completely full with the grain or other material, the grain covering the operating ends of the whistles, said members extending to a point some distance above the level of the openings 4, as shown in Fig. 2. The regulating valve 15 and the cut-off valves 14 are then opened, whereupon air will be supplied to the whistles which, however, will not be sounded, owing to the fact that the covering of grain above the openings 4 prevents the discharge of the air therethrough. When, however, the level of the grain within the hoppers falls sufficiently to uncover the openings 4, the whistles will at once sound, since the air will have a free passage therethrough, warning the mill hands that the hoppers need refilling.

As originally stated, the provision of the cut-off valves enables the communication between any one of the whistles and the supply pipe to be opened or closed at will, so that in the event of injury to any one of the whistles, it may be repaired without affecting the others. Furthermore, the intensity of the air current which flows through the supply pipe into the whistles may be regulated by opening or closing the globe valve.

What is claimed, is:—

1. The combination, with a series of hoppers, of a series of signal members having the operating portions thereof arranged for disposition within the hoppers and to be normally covered by the contents thereof; a single member connected with all of the signal members for actuating the same when the operating portions thereof are uncovered by the discharge of the contents of the hoppers; and means for cutting out the connection between any one of the signal members and the actuating member.

2. The combination, with a series of hoppers, of a series of whistles having their operating ends arranged to extend into the hoppers and to be covered by the contents thereof when the hoppers are filled; a pipe communicating with all of the whistles for supplying an operating fluid thereto, to sound the same when their operating ends are uncovered by the discharge of the contents of the hoppers; and means for cutting out communication between any one of the whistles and the supply pipe.

3. The combination, with a series of hoppers, of a series of whistles having their operating ends arranged to extend into the hoppers and to be covered by the contents thereof when the hoppers are filled; a pipe communicating with all of the whistles for supplying air thereto to sound the same when their operating ends are uncovered by the discharge of the contents of the hoppers; means for cutting out communication between any one of the whistles and the supply pipe; a fan having its casing connected with the inlet end of said pipe; and a valve located at the other end of said pipe for regulating the flow of air therethrough.

4. The combination, with a hopper, of a whistle having its operating end arranged to extend into the hopper and to be normally covered by the contents of the same; means arranged to cover the opening in said end to prevent the whistle from being choked; and a pipe communicating with the whistle for supplying an operating fluid thereto, to sound the whistle when its operating end is uncovered by the discharge of said contents.

5. The combination, with a hopper, of a whistle having its operating end arranged to extend into the hopper and to be normally covered by the contents thereof; a screen arranged to cover the opening in said end, to prevent the whistle from being choked; and a pipe communicating with the whistle for supplying an operating fluid thereto, to sound the whistle when its operating end is uncovered by the discharge of said contents.

6. The combination, with a hopper having a discharge opening formed in the bottom wall thereof, of a whistle having its operating end arranged to extend into the hopper and to be normally covered by the contents of the same; an open-ended cylindrical casing surrounding said end and disposed directly above said opening; and a pipe communicating with the whistle for supplying an operating fluid thereto to sound the whistle when said end is uncovered by the discharge of the contents of the hopper.

7. The combination, with a hopper, of a whistle having its operating end arranged to extend into the hopper and to be normally covered by the contents of the same; a foraminous member secured to the whistle for closing the notch in said end, to prevent the whistle from being choked; an open-ended cylindrical casing surrounding said end and arranged in spaced relation thereto; and a pipe communicating with the whistle for supplying an operating fluid thereto, to automatically sound the whistle when its operating end is uncovered by the discharge of the contents of the hopper.

In testimony whereof, we affix our signatures in presence of two witnesses.

BEN B. SPRATLIN.
JAMES W. SPRATLIN.

Witnesses:
A. P. FORD,
C. D. BOLTON.